United States Patent

Cameron

[15] 3,684,411

[45] Aug. 15, 1972

[54] GOVERNOR FOR FLUID DRIVEN MOTOR HAVING RECIPROCATING ELEMENTS IN ROTOR

[72] Inventor: William M. Cameron, Tokyo, Japan

[73] Assignee: Nitto Kohki Company Limited

[22] Filed: Oct. 15, 1970

[21] Appl. No.: 80,839

[30] Foreign Application Priority Data

April 11, 1970 Japan ......................45/30586

[52] U.S. Cl. .........................418/15, 418/42, 137/56

[51] Int. Cl........F01c 21/12, F03c 3/00, G05d 13/10

[58] Field of Search.....................418/40–44; 73/521; 137/56

[56] References Cited

UNITED STATES PATENTS

| | | | |
|---|---|---|---|
| 984,983 | 2/1911 | Watson | 418/42 |
| 3,054,389 | 9/1962 | Roggenburk | 418/42 |
| 3,242,936 | 3/1966 | Kalb | 137/56 |
| 824,647 | 6/1906 | Hamann | 418/42 |
| 824,648 | 6/1906 | Hamann | 418/42 |
| 1,440,224 | 12/1922 | Kasley | 137/56 |
| 3,266,506 | 8/1966 | Takahashi et al | 137/56 |
| 3,460,437 | 8/1969 | Roggenburk | 418/41 |

*Primary Examiner*—Carlton R. Croyle
*Assistant Examiner*—John J. Vrablik
*Attorney*—Flynn & Frishauf

[57] ABSTRACT

A plurality of passages are formed in the rotor of an air motor. A reciprocating element is located in each of the passages for varying the flow of air through the passages in response to pressure of the air on the reciprocating element and further in response to the centrifugal force acting on the reciprocating elements, thereby regulating the speed of the rotor.

16 Claims, 11 Drawing Figures

4
17a
8a
20a
16a
2a
15a
19
18
3
7
14
2b
15b
II
16b
20b
17b
8b
6
10
9
13
5
12
II
I

11
A
14
5
4
3
18
7
B
19
15b
1
13
9
12
6
C
16a,16b
17a,17b 4
66
68a
65a
2a
3
66
67
2b
68b
65b
18
69
6

68a
4
65a
2a
3
18
67
2b
68b
69
65b
66
6

65a
2a
68a
4
3
67
61
80
2b
68b
65b
69
18
6

TORQUE
AIR PRESS (6Kg/Cm²)
A
POWER
AIR CONSUMP
TORQUE (Kg-Cm)
POWER (HP)
AIR CONSUMPTION (m³/min)
28
24
20
16
12
8
4
1.4
1.2
1.0
0.8
0.6
0.4
0.2
1
2
3
4
5
6
7
SPEED (X 1000 r.p.m.)

GOVERNOR FOR FLUID DRIVEN MOTOR HAVING RECIPROCATING ELEMENTS IN ROTOR

This invention relates to air motors, and more particularly to an improved governor for air motors.

Air motors have a wide range of applications for general motor use, motor driven tools and the like, because they are superior to electric motors in that they experience no troubles due to overloads, they can provide high rotational speeds and control of the rotational speed may be easily adjusted by adjusting the air pressure. Air motors are also easy to operate and to repair. Further, they are smaller in size and weight than electric motors with equivalent output.

In air motors, however, a disadvantage is that rotational speed varies according to the change of load. An air governor is generally provided to obviate this defect. In a grinding tool, for example, grind stones are liable to break off due to the centrifugal force when the rotational speed exceeds a predetermined upper limit during no load rotation. A governor, therefore, is indespensable for this kind of tool to maintain the rotational speed below the fixed upper limit, even under no load rotation. The governor simultaneously prevents rotational speeds from being lowered due to an increase in the load by controlling the supply air.

Conventional governors, one example of which is shown in U.S. Pat. No. 3,421,412, are characterized in that an automatic switch system employed for the adjustment valve of the supplied air which is operated by the action of the fly wheel arranged on the end of the rotor shaft. The prior art governor, however, has a complex, large and heavy construction, thereby impeding the viewing angle of an operator and making it more difficult to handle. Thus operating efficiency is lowered.

The main object of the present invention is to provide an air governor for an air motor which is of simple construction and which provides accurate operation, and which can be constructed in a large part within the rotor of the motor to miniaturize the resulting motor assembly, thus obviating the defects of the prior art.

SUMMARY OF THE INVENTION

According to a first aspect of the present invention, a fluid driven motor and governor arrangement includes a number of passages formed in the rotor and communicating with the air chamber of the motor. A reciprocating element is located in each of the passages for varying the flow of supply fluid through the passages in response to pressure of the fluid on the reciprocating element and further responsive to the centrifugal force acting on the reciprocating elements. Exhaust holes are formed in the housing to exhaust fluid from the rotor passages and out from the motor during operation. The location of the reciprocating element in the passages determines the exhaust of fluid.

According to a second aspect of the present invention, a fluid driven motor and governor arrangement includes a number of passages formed in the rotor and communicating with the air chamber of the motor. A source of supply fluid, such as compressed air, is coupled to the rotor passages and a reciprocating element is located in each of the passages for varying the flow of the supply fluid through the passages to the air chamber responsive to the pressure of the supply fluid on the reciprocating elements and further responsive to the centrifugal force acting on the reciprocating elements. At least one exhaust hole is formed in the housing of the motor to exhaust fluid from the chamber and out from the motor. The position of the reciprocating element in the passages varies the flow of supply fluid to the air chamber of the motor, thereby controlling the speed of the motor.

BRIEF DESCRIPTION OF THE DRAWINGS

The drawings show the preferred embodiments of the governor of the air motor according to the present invention in which.

DETAILED DESCRIPTION OF THE PREFERRED EMBODIMENTS

Figure 1:
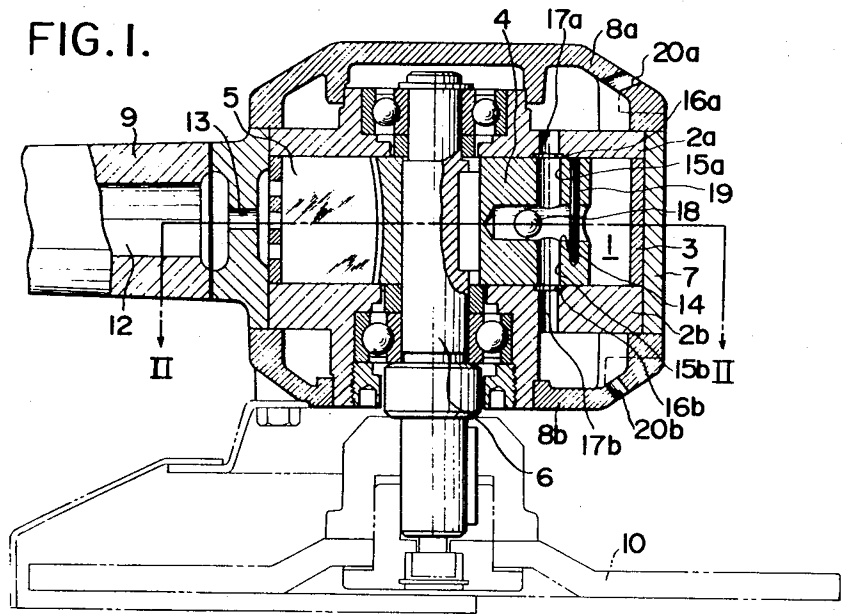
FIG. 1 is a cross sectional view of a first embodiment of an air motor assembly member in accordance with the present invention.

FIGS. 1 to 4 illustrate an air motor utilized in a grinder tool. There are many other uses, however, for such an air motor. The air motor is comprised of the air chamber 1 enclosed with the side plates **2*a* and 2*b* and the cylinder 3, rotor 4, vanes 5, rotor shaft 6 and the body 7 covering the same. In FIGS. 1 to 4, 8*a*, 8*b*, 9 and 10 denote the upper cover, the grip of the tool and the grinder, respectively. The grinder 10 is operatively coupled to the shaft 6** of the air motor.

Figure 2:
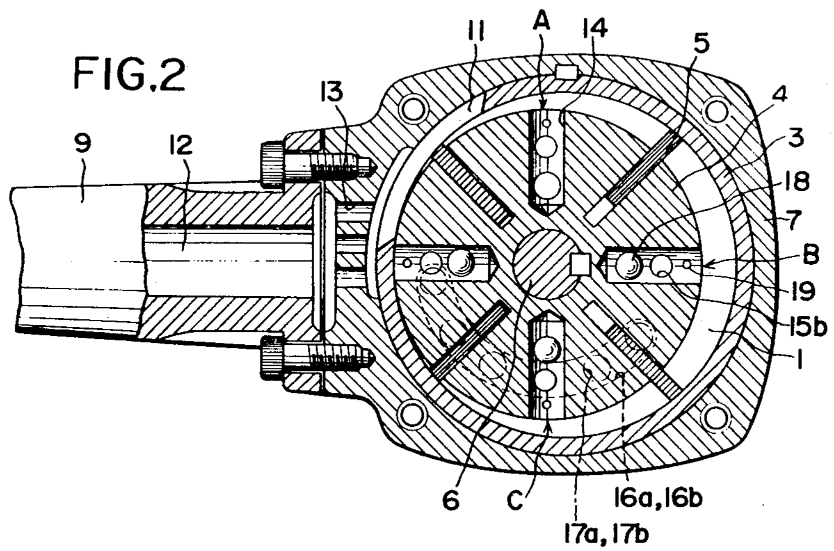
FIG. 2 is a plane view of the air motor assembly member shown in FIG. 1.

The cylinder 3 is provided with a notch portion 11, shown in FIG. 2, which is in communication with air supply holes (i.e., passages) 12 and 13 bored in the grip 9 and the body of the tool. A plurality of exhaust holes 14 (four holes are bored according to the present embodiment) are bored between the vanes 5 in the radial direction of the rotor 4 and in the perpendicular direction relative to the axial direction of the rotor shaft 6. The exhaust holes 14 are connected to one another and communicate with the air chamber 1. Exhaust holes **15*a* and 15*b* are bored in the rotor in a direction in parallel with the axial direction of the rotor shaft 6. Exhaust holes 15*a* and 15*b* are coupled to exhaust holes 14 to respectively lead the exhaust air off in both upper and the lower directions relative to the axial direction of the rotor. Portions of the upper and lower side plates 2*a* and 2*b* which are in registration with the rotor exhaust holes 15***a* and 15*b* are provided with the arc shaped grooves 16*a* and 16*b* and are bored with exhaust holes 17*a* and 17*b*, as clearly shown in FIG. 1. Exhaust holes 20*a* and 20*b* are bored in the upper and lower covers 8*a* and 8*b*, respectively. The arc shaped portions on the grooves 16a and 16*b* of the side plates are large enough to accommodate a number of exhaust holes 17*a* or 17*b* arranged as shown in FIG. 2. The size of the grooves 16*a* and 16*b* and the size of the exhaust holes 17*a* and 17*b* depend upon the amount of the air to be exhausted and the size and capacity of the motor.

A ball 18 is enclosed inside each exhaust hole 14. The ball 18 moves outwardly due to the centrifugal force caused by rotation of the rotor 4 until its outward movement is stopped by a pin 19 mounted in the exhaust hole 14.

Figure 3:
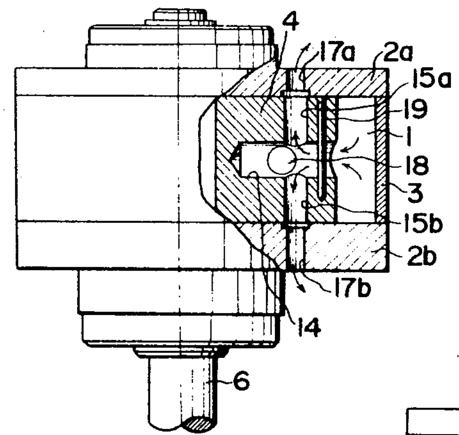
FIGS. 3 and 4 are cross sectional side views with the motor covers removed, illustrating the operation of the air motor of FIGS. 1 and 2.
Figure 4:
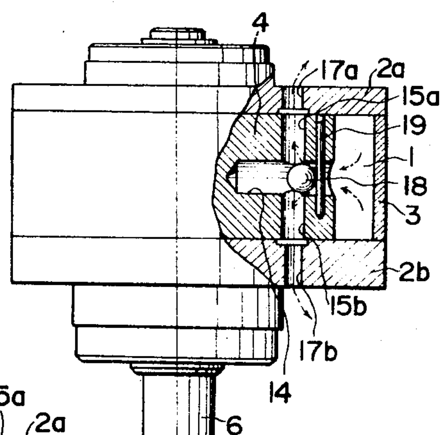

The automatic adjustment means for adjusting the amount exhaust of exhaust air is described below:

1. The air is supplied to the cylinder 3 through the supply passage 12 of the grip 9, the supply passage 13 of the body 7 and the notch portion 11 of the cylinder 3 (position A in FIG. 2).
2. The air is compressed in the air chamber 1 surrounded by the cylinder 3, the rotor 4, the upper and the lower side plates 2*a* and 2*b* and the vane 5. The rotor 4 rotates (see position B in FIG. 2).
3. As a result, the arc shaped grooves 16*a* and 16*b* of the upper and the lower side plates 2*a* and 2*b* become in registration with the exhaust holes 15*a* and 15*b* of the rotor (see FIG. 1 and position C in FIG. 2).
4. The ball 18 moves in hole 14 in the direction towards the rotor shaft 6 due to the compressed air in spite of the centrifugal force, as shown in FIG. 3, if the rotational speed of the rotor 4 is low (for example, 3,000 r.p.m. in FIG. 11). Accordingly, the air from chamber 1 is exhausted out in the direction of the arrow and the rotational speed of the motor increases.
5. If the rotational speed of the rotor is high (for example 12,000 r.p.m. in FIG. 11) the ball 18 moves outwardly due to centrifugal force until it is stopped by the pin 19, the centrifugal force, in this case, overcoming the pressure of the compressed air from chamber 1. Accordingly, since the ball 18 at least partially blocks holes 15*a* and 15*b*, the amount of exhaust air is thereby automatically adjusted to be smaller and the rotational speed of the motor is caused to decrease. An equilibrium condition is eventually reached.

The air is exhausted out of the motor through the exhaust holes 17*a* and 17*b* in the side plates 2*a* and 2*b*, respectively, and the holes 20*a* and 20*b* of the upper and the lower covers 8*a* and 8*b*, respectively.

Figure 5:
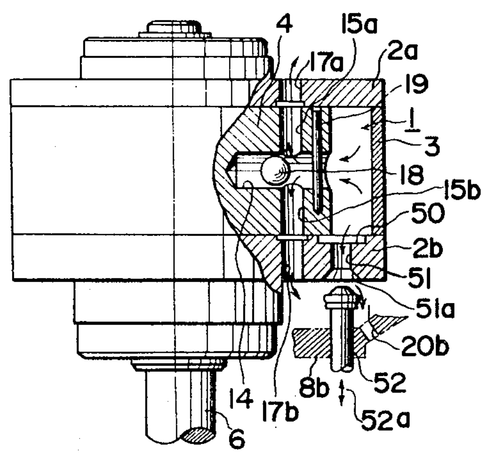
FIG. 5 is a cross sectional view of a second embodiment of an air motor in accordance with the present invention.

FIG. 5 shows another embodiment of the present invention based on the governor of FIGS. 1 to 4, but which is provided with an additional exhaust air passage. The same reference numerals are used to designate corresponding elements throughout the drawings. The side plate 2*b* has a groove 50 formed therein. An exhaust hole 51 is bored in side plate 2*b* which connects to the air chamber 1 via groove 50. The cover 8b (partially shown in FIG. 5) is provided with a valve 52 which cooperates with the opening 51*a* of the exhaust hole 51. Opening 51*a* is shaped to properly seat with the valve 52. The valve 52 moves vertically in the directions of the arrow 52*a* by automatic or mechanical means (not shown). When the exhaust hole 51 is closed by valve 52, the same exhaust operation as that of the embodiment of FIGS. 1 to 4 is provided. When the exhaust hole 51 is opened, larger amounts of air is exhausted through hole 20*b* than in the embodiment of FIGS. 1–4. Thus, the rotational speed of the rotor is more easily and quickly increased with the embodiment shown in FIG. 5. This arrangement provides a more responsive governor operation. In FIG. 5, the exhaust hole 51 is positioned on the lower side plate 2*b*, but it can be alternatively positioned on the upper side plate 2*a*, or a hole 51, or the like, can be located on both side plates 2*a* and 2*b*.

Another embodiment of the present invention will be described with reference to FIGS. 6 to 9. This embodiment attains the same effects at the previous embodiments, but by adjustment of the amount of supply air, whereas in the previously described embodiments the rotational speed of the rotor was controlled by adjustment of the exhaust air.

Figure 6:
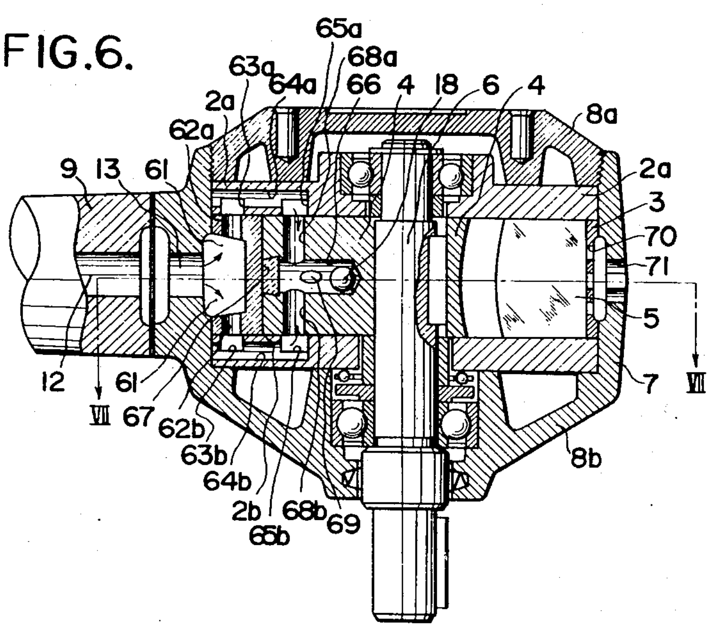
FIG. 6 is a cross sectional view of a third embodiment of an air motor assembly member according to the present invention.
Figure 7:
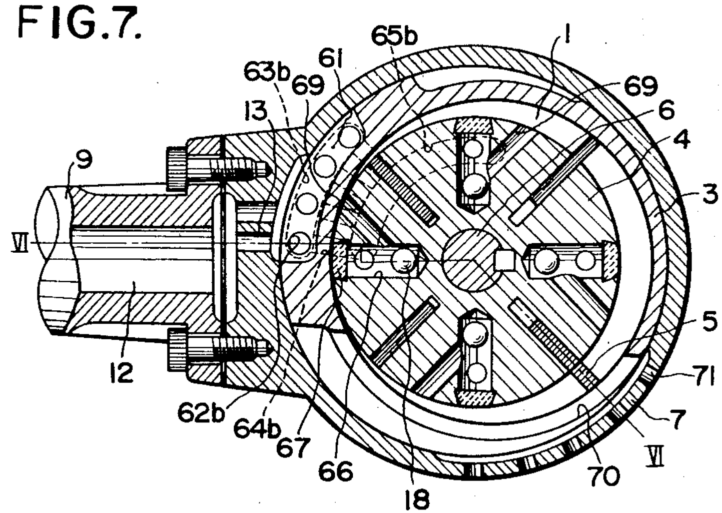
FIG. 7 is a plane view of the air motor assembly member shown in FIG. 6.

The construction of the air governor of FIGS. 6 to 9 is similar to that of FIG. 1, but the different parts are explained below. Corresponding elements in FIGS. 1 and 6 are designated by the same reference numerals. The cylinder 3 is connected to a supply groove 61 as shown in FIG. 6. Cylinder 3 has holes 62*a* and 62*b* formed therein which couple the supply groove 61 with the upper and the lower side plates 2*a* and 2*b*, respectively. The upper and the lower side plates 2*a* and 2*b* have grooves 63*a* and 63*b*, respectively, bored therein which couple to the holes 62*a* and 62*b*, respectively. The upper and lower side plates 2*a* and 2*b* further have grooves 65*a* and 65*b*, respectively, formed therein, holes 64 and 64*b* being formed in the upper and lower side plates, respectively. Hole 64*a* couples groove 63*a* to groove 65*a*, and hole 64*b* couples groove 63*b* to groove 65*b*. The various grooves and holes are also indicated in FIG. 7.

A plurality of supply holes 66 corresponding to the exhaust holes 14 in FIG. 1 are radially bored in the rotor 4 in the perpendicular direction relative to the rotor shaft 6. The supply holes 66, however, are closed by means of the stopper member 67 enclosing the ball 18 therein. Further, the rotor 4 is bored with holes 68*a* and 68*b* which are parallel with the axis of shaft 6, for connecting the supply hole 66 with the grooves 65*a* and 65*b* of the upper and the lower side plates respectively. A slanting hole 69 is formed in rotor 4 for connecting the supply hole 66 with the air chamber 1. The cylinder 3 and the body 7 are provided with the exhaust holes 70 and 71, respectively.

Figure 8:
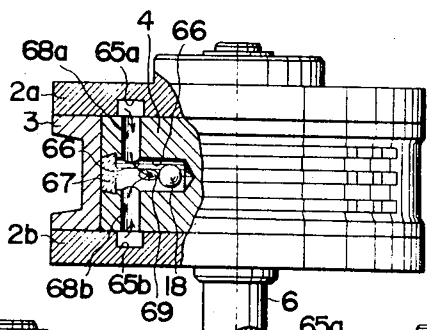
FIGS. 8 and 9 are cross sectional side views illustrating the operation of the air motor of FIGS. 6 and 7.

The embodiment of FIGS. 6–9 operates as follows:

1. The rotor 4 rotates and the holes 68*a* and 68*b* become engaged with the grooves 65*a* and 65*b* of the upper and the lower side plates 2*a* and 2*b*, respectively, thus permitting air to be supplied to holes 68*a* and 68*b*.
2. If the rotor speed is low, the ball 18 moves toward the axis of the shaft 6 against the centrifugal force of the rotor as shown in FIG. 8. Accordingly, the input air is supplied to the air chamber 1 through the groove 61 of the cylinder 3, the holes 62*a* and 62*b* of the upper and the lower side plates, grooves 63*a* and 63*b*, the holes 64*a* and 64*b*, the grooves 65*a* and 65*b*, the supply holes 68*a* and 68*b* and the slanting hole 69. When the speed is low and the ball moves towards the axis of the rotor shaft 6, the ball does not influence the supply air and thus, the rotational speed of the rotor is increased.

Figure 9:
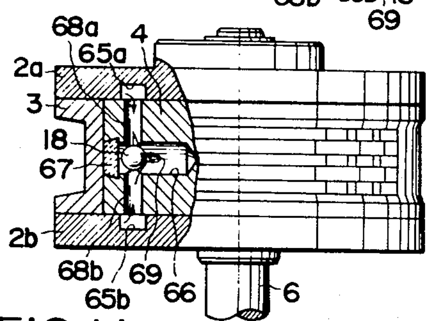

3. When the rotor speed is high, the ball 18 moves outwardly as shown in FIG. 9 due to the centrifugal force. Thus, the air supply to the slanting hole 69 is at least partially obstructed by the ball 18, thereby reducing the air flow to air chamber 1, thus causing the rotational speed of the rotor to become lower. As the rotor speed gets too low, ball 18 moves inwardly under the influence of the input air pressure and allows more air to flow to cylinder 1, thereby causing the rotor speed to again increase. This process is automatically repeated to maintain a stable rotor speed.

Thus, the embodiment of FIGS. 6–9 provides speed control by adjusting the input air flow, whereas the embodiments of FIGS. 1–5 provide speed control by adjusting the exhaust air flow.

Figure 10:
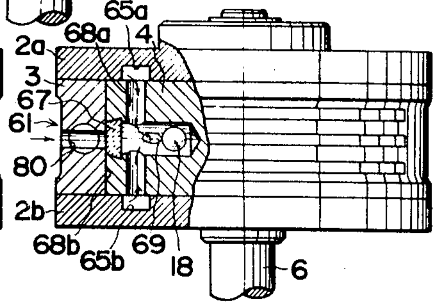
FIG. 10 is a cross sectional view of a fourth embodiment of an air motor according to the present invention.

Another embodiment of the present invention will be explained with reference to FIG. 10. This embodiment is similar to that of FIGS. 6–9, and only a partial view thereof, showing the additional features, is given in the drawings. The governor of FIG. 10 is provided with an additional air supply passage. The embodiment of FIG. 10, in addition to the elements of the governor shown in FIGS. 6–9, has an extra air supply passage 80 formed in cylinder 3 which connect the groove 61 of the cylinder 3 directly with the air chamber 1 in the cylinder. As a result, the amount of the supplied air is high and the rotational speed of the rotor tends to increase. A valve may be provided in passage 80 to vary the air flow therethrough.

Various shapes of balls 18 are applicable for use in the present invention if they are movable by means of the centrifugal force of the rotor, and if they are able to obstruct (and/or block) the perpendicular hole and the slanting hole.

The air motor governor of the present invention provides many advantageous effects. The main advantageous effects are as follows:

1. The governor is installed inside the air motor and integral therewith by making efficient use of the rotor, so that the construction of the whole body is simple, and the air supply and the air exhaust operations are accurately carried out.
2. The resulting air motor is therefore compact and light in weight, thus providing a wide range of applications as a power source for various portable tools such as grinders, sanders, drills, and the like.
3. The air motor of the present invention additionally provides all of the advantages of the prior art motors.

Figure 11:
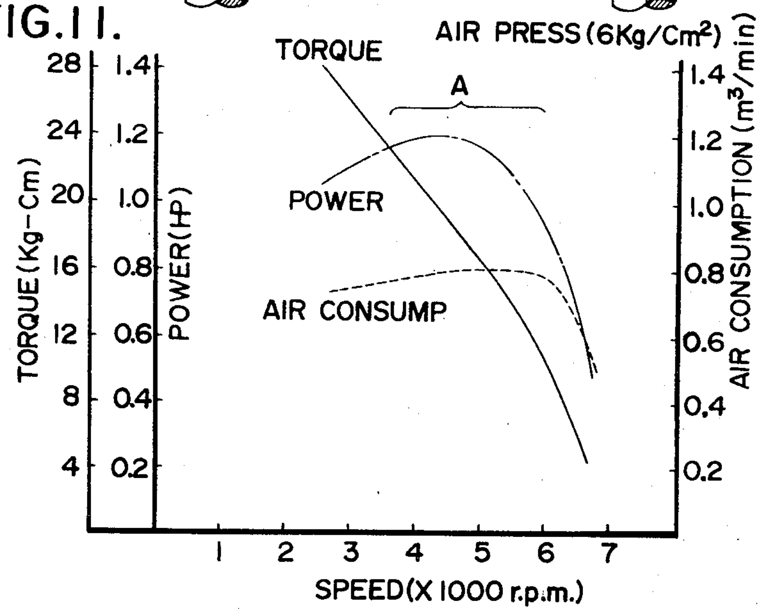
FIG. 11 is a graph showing the efficiency of a general air motor.

The air motor provided with the governor of this invention can be designed to accurately operate at the optimum power conditions as shown by the curves of FIG. 11. The present governor enables more accurately controlled operation and thus, the operating effeciency of the air motor is very high.

What is claimed is:

1. In a fluid driven motor having a housing means forming a chamber therein, a source of supply fluid coupled to said chamber, and a rotor shaft having a rotor thereon, said rotor shaft and rotor being rotatably mounted in said chamber;

a governor arrangement comprising:

a plurality of passages formed in said rotor and communicating with said chamber, said passages receiving said supply fluid after said supply fluid has imparted rotary forces to said rotor;

a free moving reciprocating element in each of said passages for varying the flow of said fluid through said passages responsive to the pressure of said fluid on said reciprocating elements and responsive to the centrifugal force acting on said reciprocating elements, said centrifugal force acting on said reciprocating elements in a direction opposite to said pressure of said fluid; and means to exhaust fluid from said rotor passages and out from the motor.

2. A motor according to claim 1 wherein said rotor passages each include:

a first passage formed in said rotor in the radial direction of said rotor, said reciprocating element being enclosed in said first passage, said first passage being dimensioned such that a clearance always exists between said element and said first passage for flow of said fluid therebetween; and a second passage formed in said rotor and communicating said first passage with said exhaust means which includes exhaust holes formed in said housing means.

3. A motor according to claim 1 wherein said reciprocating element is a ball and comprising a pin in each of said first rotor passages to retain said ball in said rotor passage.

4. A motor according to claim 1 wherein said source of supply fluid is a source of compressed air.

5. A motor according to claim 1 wherein said exhaust means includes exhaust holes formed in said housing means and engageable with said respective rotor passages during portions of the rotation of said rotor.

6. A motor according to claim 5 wherein said housing means includes upper and lower side plates, each side plate having exhaust holes formed therein.

7. A motor according to claim 1 wherein said housing means includes an additional exhaust hole coupled to said chamber; and including means for selectively opening and closing said additional exhaust hole independent of the operation of said reciprocating element to selectively exhaust fluid from said motor chamber.

8. A motor according to claim 7 wherein said housing means includes upper and lower side plates, said additional exhaust hole being formed in at least one of said side plates.

9. In a fluid driven motor having a housing means forming a chamber therein, a source of supply fluid, and a rotor shaft having a rotor thereon, said rotor shaft and rotor being rotatably mounted in said chamber;

a governor arrangement comprising:

a plurality of passages formed in said rotor and communicating with said chamber;

means coupling said source of supply fluid to said rotor passages for feeding supply fluid thereto;

a free moving reciprocating element in each of said passages for varying the flow of said fluid through said passages and to said chamber responsive to the pressure of said fluid on said reciprocating elements and responsive to the centrifugal force acting on said reciprocating elements, said reciprocating elements being located in their respective passages such that said centrifugal force acting thereon is in a direction opposite to the pressure of said fluid thereon; and at least one exhaust hole formed in said housing means to exhaust fluid from said chamber and out from the motor.

10. A motor according to claim 9 wherein said means coupling said source of supply fluid to said rotor passages includes at least one supply passage formed in said housing means which engages with said respective rotor passages during portions of the rotation of said rotor.

11. A motor according to claim 9 wherein said housing means includes upper and lower side plates, each side plate having at least one supply passage formed therein.

12. A motor according to claim 9 wherein said rotor passages each include:

a first passage formed in said rotor in the radial direction of said rotor, said reciprocating element being enclosed in said first passage;

a second passage formed in said rotor and coupling said source of supply fluid to said first passage; and a third passage formed in said rotor coupling said supply supply fluid from said first passage to said chamber, said reciprocating element varying the flow of fluid to said third passage.

13. A motor according to claim 9 wherein said reciprocating element is a ball and wherein said second passage is a chamber formed within said rotor and which does not directly communicate with said housing chamber said second chamber being dimensioned such that a clearance always exists between said ball and a wall portion of said second chamber.

14. A fluid driven motor governor according to claim 9, comprising means coupling said source of supply fluid directly to said chamber; and means for selectively opening and closing said direct supply means independent of the operation of said reciprocating element to selectively feed supply fluid to said chamber.

15. A motor according to claim 9 wherein said housing means includes upper and lower side plates, said direct supply means being formed in at least one of said side plates.

16. A motor according to claim 9 wherein said source of supply fluid is a source of compressed air.

* * * * *